March 3, 1964    H. BERTRANG ETAL    3,123,179
WIND-UP ARRANGEMENT FOR SPRING MOTORS
Filed March 29, 1961    2 Sheets-Sheet 1

INVENTORS
Hermann Bertrang
BY and
Wilhelm Haupt

March 3, 1964     H. BERTRANG ETAL     3,123,179

WIND-UP ARRANGEMENT FOR SPRING MOTORS

Filed March 29, 1961     2 Sheets-Sheet 2

INVENTORS
Hermann Bertrang and Wilhelm Haupt
BY
their attorney

United States Patent Office 3,123,179
Patented Mar. 3, 1964

3,123,179
WIND-UP ARRANGEMENT FOR SPRING MOTORS
Hermann Bertrang and Wilhelm Haupt, Villingen, Black Forest, Germany, assignors to Kienzle Apparate G.m.b.H., Villingen, Black Forest, Germany
Filed Mar. 29, 1961, Ser. No. 99,204
Claims priority, application Germany Mar. 30, 1960
11 Claims. (Cl. 185—40)

The present invention relatese to a wind-up arrangement for spring motors, and more particularly to a wind-up arrangement in which an electromagnetic wind-up means winds up a spring motor when the same has run down.

When the spring motor is wound up, the electromagnetic wind-up means releases the spring motor, and in this moment, a peak torque occurs which influences the speed of an element driven by the spring motor.

It is known to provide a buffer spring which is directly operated by the spring motor to accumulate energy for the purpose of reducing the peak torque. However, the known apparatus is incapable of completely eliminating the influence of the momentary peak torque on the driven element, so that the constant movement of the driven element is interrupted by a momentary acceleration.

Buffer springs for this purpose are particularly used for wind-up devices for clocks where a small jerky movement of the minute hand is immaterial, and cannot be noticed by an observer.

However, if registering instruments are driven by automatically wound up spring motors, then it is of greatest importance for an accurate registration of data that the motion of the driven element remains absolutely constant, and is not interrupted by short accelerated movements caused by the peak torque occurring at the end of a wind-up operation. Every time the spring motor is wound up, the registering element, for example a record carrying rotary element on which a graphical recording is made by a stylus, performs a short motion at a speed different from its normal continuous and uniform speed, so that the recording made at this moment is incorrect.

It is one object of the present invention to overcome this disadvantage of known wind-up apparatus for spring motors, and to provide a wind-up apparatus which does not detrimentally influence the uniform and constant speed of an element driven by the spring motor.

Another object of the present invention is to provide means for preventing a jerky motion of an element driven by spring motor when the spring motor is being wound-up.

Another object of the present invention is to provide an elastic dampening motion transmitting member in a reduction transmission connecting the spring motor with the driven element.

Another object of the present invention is to provide in addition to a buffer spring capable of accumulating energy and quick in recovering, an elastic dampening motion transmitting member consisting of an elastomer in the transmission by which the spring motor is connected to the driven element. Another object of the present invention is to provide in the transmission connecting the spring motor with the driven element, at least two resilient motion transmitting members having different resilience.

With these objects in view, the present invention relates to a wind-up arrangement for a spring motor. One embodiment of the invention comprises a spring motor including a member urged by a spring to move to one position, wind-up means for moving the movable member to another position, a reduction transmission means including a first transmission member driven from the spring motor at a first speed, and a second transmission member driven from the first transmission member at a lower speed, a third transmission member, and an elastic motion transmission member, for example a tubular body consisting of an elastomer such as rubber or a synthetic material, and connecting the second and third transmission members, and an element, for example a rotary record carrier element driven from the third transmission member. In this arrangement, the elastic motion transmission member dampens a peak torque occurring when the wind-up means is disconnected from the spring motor whereby the driven element continues to move at a constant speed when the peak torque occurs.

The movable member is connected by a buffer spring, for example a coil spring, to the first transmission member, and it is preferred to provide a one-way coupling between the spring motor and the buffer coil spring. In the preferred embodiment of the invention, the buffer spring is capable of accumulating energy, and has a different resilient resistance and capacity to recover than the elastic motion transmitting member. Due to the fact that the elastic motion transmitting member is provided in the reduction transmission, the transmission members which apply a deforming torque on the elastic motion transmitting member, move at a lower speed than the members which resiliently tension the buffer spring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
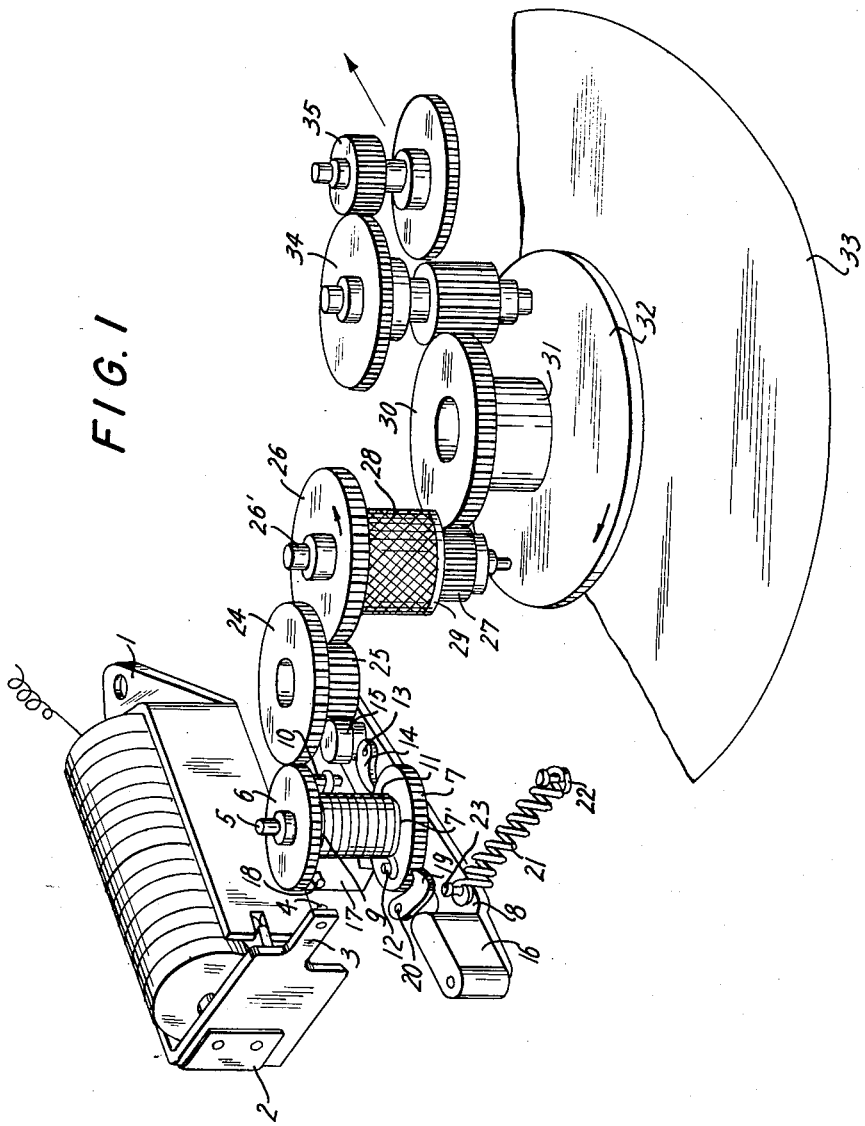
FIG. 1 is a fragmentary perspective view illustrating a wind-up arrangement for a spring motor driving a record carrier.

Referring now to the drawings, and more particularly to FIG. 1, a record carrier 33 is located on a record carrying element 32 and turns with the same. Element 32 is driven by a gear 30 through a tubular member 31. Gear 30 meshes with a pinion 27 which is connected by an elastic motion transmitting element 28, 29 to another gear 26 which meshes with a pinion 25 secured to a gear 24. Consequently, the driven element 32, and also the elastic motion transmitting member 28, will turn at a smaller rotary speed than gear 24. A gear train 34, 35 is driven by gear 30, and is connected to means for regulating the speed of the drive.

Figure 2:
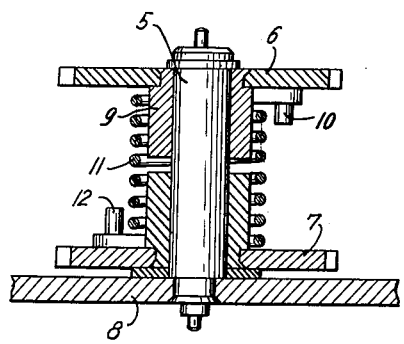
FIG. 2 is an axial sectional view of a buffer spring construction used in the embodiment of FIG. 1.

Gear 24 is driven from a spring motor which includes a movable lever member 8 which is pivotally mounted on a shaft 5 and urged by a spring 21 to turn in counterclockwise direction as viewed in FIG. 1. Spring 21 is secured to a pin 23 on lever member 8, and to a fixed pin 22 which is secured to the frame of the apparatus, not shown. As best seen in FIG. 2, shaft 5 also supports the hub portion 9 of a gear 6, and also the hub portion of a ratchet wheel 7, for turning movement. A pin 10 is secured to gear 6, which meshes with gear 24, and is connected to one end of a coil spring 11 whose other end is secured to a pin 12 on ratchet wheel 7.

A ratchet pawl 14 is turnably mounted on lever member 8, and engages the ratchet wheel 7 so that lever member 8 is coupled to the ratchet wheel 7 during turning movement in counterclockwise direction, but is not coupled to ratchet wheel 7 during turning movement in clockwise direction. A locking pawl 19 is turnably mounted on a stationary pin 20, and cooperates with ratchet wheel 7 to prevent a turning movement of ratchet wheel 7 under the force of the coil spring 11.

Lever 8 has weights 15 and 16 secured to the ends thereof, and is provided with a transverse projection 17 having a contact 18 thereon.

When spring 21 is tensioned, it urges lever 8 to turn in counterclockwise direction, so that pawl 14 turns ratchet wheel 7 in the same direction whereby spring 11 is tensioned and transmits a torque to gear 6 which drives the driven element 32 through the transmission means 24, 25, 26, 28, 27, and 30. An electromagnetic wind-up means is provided for winding up the spring motor 8, 21. The electromagnetic means 1 has a movable armature 2 with a projection 3 carrying a contact 4 which cooperates with contact 18. The solenoid of electromagnetic means 1 is connected in series with the contacts 4 and 18, and the solenoid and contact 18 are connected to a voltage source, not shown.

While element 32 is driven from spring 21, lever 8 turns in counterclockwise direction until contact 18 touches contact 4 whereby the circuit of the solenoid is closed, and the armature 2, 3 attracted. The armature moves to the right as viewed in FIG. 1, and the contact pin 4 abutting on contact pin 18 exerts a force on the projecting arm 17 of lever 8 so that lever 8 is turned in clockwise direction against the action of spring 21 until spring 21 is again fully tensioned. In this position, armature 2, 3 is stopped, while lever 8 continues its movement due to inertia produced by the weights 15 and 16. Consequently, contacts 18 and 4 separate so that the circuit of the solenoid is interrupted, and armature 2, 3 returns to its initial positions moving to the left under the action of a spring, not shown.

During this wind-up operation, pawl 14 slides on the surface of ratchet wheel 7 which is blocked by the blocking pawl 19. When armature 2, 3, 4 separates from contact pin 18, the main spring 21 becomes again effective and turns lever member 8 and pawl 14 in counterclockwise direction so that ratchet wheel 7 is subjected to a torque which is transmitted through buffer spring 11 to gear 6, and from there through the reduction gearing to the elastic motion transmitting member 28.

Figure 3:
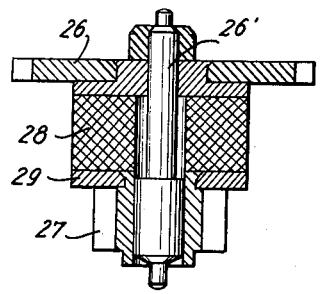
FIG. 3 is an axial sectional view of an elastic motion transmitting element used in the embodiment of FIG. 1.

The elastic motion transmitting member is best seen in FIG. 3 which shows a shaft 26' rotatably supporting gear 26 and pinion 27. Member 28 is tubular, and consists of an elastomer, such as rubber or an elastic synthetic material. The annular end faces of the elastic member 28 are vulcanized to a pair of metal plates which are secured to gears 26 and 27 respectively. Consequently, the torque applied to gear 26 is transmitted by the elastic tubular member 28 to pinion 27 while the end plates 29 are angularly displaced relative to each other dependent on the transmitted torque.

The apparatus operates as follows:

Assuming that the spring motor has just been wound up by electromagnetic means 1 the movable member 8, 15, 16 is turned in clockwise direction to an end position in which the main spring 21 is expanded and fully tensioned. Spring 21 will tend to contract, and will urge member 8 to turn in counterclockwise direction about shaft 5. During this movement, ratchet wheel 7 of the one-way coupling 7, 14 is turned by pawl 14. If spring 11 is untensioned, it will be first tensioned until it is capable of storing enough energy to transmit the torque to gear 6 which drives the driven record carrier element 32 through the reduction transmission which includes the elastic motion transmitting member 28. As lever 8 continues to turn in counterclockwise direction under the force of spring 21, buffer spring 11 will remain tensioned, and the elastic motion transmitting element 28 will also be slightly tensioned, since a driving torque is required for turning the driven element 32 which rotates at a constant rotary speed.

When lever member 8 arrives at a predetermined end position, contact pin 18 on arm 17 of lever 8 engages contact pin 4 on the armature 2, 3 of the electromagnetic means 1. A circuit is closed, the solenoid of electromagnetic means 1 is energized, and the armature 2, 3 is attracted and moves rapidly to the right as viewed in FIG. 1 so that force is transmitted from contact pin 4 to contact pin 18, and arm 17 and lever 8 are turned in clockwise direction against the force of spring 21 which is tensioned.

During such clockwise movement, pawl 14 slides on ratchet wheel 7, and due to the tensioned condition of spring 11, ratchet wheel 7 has the tendency to follow pawl 14 as the same moves with lever 8. However, the blocking pawl 19 prevents such turning movement of ratchet wheel 7 in clockwise direction, and since buffer spring 11 is tensioned, it immediately exerts a torque on gear 6 which is transmitted to the record carrier element 32 which continues to rotate at uniform speed, although spring motor 8, 21 is temporarily ineffective to drive record carrier element 32 while being wound up.

Since the wind-up operation takes only a very short time, the energy accumulated in the buffer spring 11 is sufficient for maintaining the rotation of the driven element 32 until the main spring 21 becomes again effective upon release of contact pin 18 by contact pin 4.

As explained above, as soon as main spring 21 becomes again effective to turn lever 8 in counterclockwise direction, pawl 14 will transmit the torque to ratchet wheel 7, from where the torque is further transmitted through spring 11 to gear 6.

At the moment at which the torque is no longer supplied by spring 11, but is supplied through pawl 14 by the newly tensioned main spring 21, a peak torque occurs, which would cause a certain acceleration of the driven element 32 above its normal constant speed, were it not for the elastic motion transmitting member 28 which takes up the peak torque due to its resiliency, by being slightly tensioned. As ratchet wheel 7 continues to be turned by pawl 14, the elastic motion transmitting member 28 slowly returns to its normal position, and experience and tests have shown that the undesired momentary acceleration of the driven element 32 is completely eliminated and that the same continues to rotate at constant speed while the drive of the apparatus is switched from buffer spring 11 to the main spring 21.

The best result is obtained, if the elasticity of spring 11 is substantially different from the elasticity of the elastic motion transmitting member 28.

From the above description of the operation, it will become apparent that the buffer spring 11 mainly constitutes an energy accumulator for storing energy during the drive of the driven element by the main spring of the spring motor, and for supplying the accumulated energy while the spring motor is ineffective during its wind-up operation. While buffer spring 11 also has a certain effect in suppressing torque oscillations, it is only by the provision of another elastic motion transmitting member that a completely uniform speed of the driven element can be obtained. The elastic motion transmitting member 28 is effective both during the time period in which springs 21 and 11 supply the torque, and during the time period in which only spring 11 supplies the torque.

The elastic motion transmitting member is particularly effective to suppress torque oscillations, if provided in a part of the transmission which runs at a lower speed, and it will be noted that gear 26 rotates at a lower speed than gear 6 so that a smaller torque acts on the elastic motion transmitting member 28 than on the buffer spring 11.

Due to the fact that the elastic motion transmitting member is made of an elastomer, its return to its normal position after being tensioned by a peak torque is slow, as is desired for maintaining the constant speed of the driven element 32.

It will be understood that each of the elements described above, or two or more together, may also find a useful application in other types of spring motors differing from the types described above.

While the invention has been illustrated and described as embodied in a wind-up arrangement for a spring motor including means for suppressing torque fluctuations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a buffer spring having one end connected to said movable member so as to be tensioned by said main spring during movement of said movable member to said one position; holding means for holding said one end of said buffer spring so as to prevent untensioning of the same while said movable member is moved by said wind-up means to said other position; transmission means including a first transmission member connected to the other end of said buffer spring and driven by said main spring through said movable member and through said buffer spring during movement of said movable member to said one position and being driven by said buffer spring during movement of said movable member to said other position, a second transmission member, and an elastic dampening motion transmitting means connecting said first and second transmission members; and an element driven from said second transmission member so that said elastic motion transmitting member dampens a peak torque occurring when said wind-up means is disconnected from said movable member and said main spring becomes again effective in said other position of said movable member, whereby said element continues to move at a constant speed when said peak torque occurs.

2. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a buffer spring having one end connected to said movable member so as to be tensioned by said main spring during movement of said movable member to said one position; holding means for holding said one end of said buffer spring so as to prevent untensioning of the same while said movable member is moved by said wind-up means to said other position; transmission means including a first transmission member connected to the other end of said buffer spring and driven by said main spring through said movable member and through said buffer spring during movement of said movable member to said one position and being driven by said buffer spring during movement of said movable member to said other position, a second transmission member, and an elastic dampening motion transmitting means consisting of an elastomer and connecting said first and second transmission members; and a record carrier driven from said second transmission member so that said elastic motion transmitting member dampens a peak torque occurring when said wind-up means is disconnected from said movable member and said main spring becomes again effective in said other position of said movable member, whereby said record carrier continues to move at a constant speed when said peak torque occurs.

3. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a buffer spring having one end connected to said movable member so as to be tensioned by said main spring during movement of said movable member to said one position; holding means for holding said one end of said buffer spring so as to prevent untensioning of the same while said movable member is moved by said wind-up means to said other position; transmission means including a first transmission member connected to the other end of said buffer spring and driven by said main spring through said movable member and through said buffer spring during movement of said movable member to said one position and being driven by said buffer spring during movement of said movable member to said other position, a second transmission member connected to and driven from said first transmission member at a lower speed, a third transmission member, and an elastic dampening motion transmitting member consisting of an elastomer and connecting said second and third transmission members; and a record carrier driven from said third transmission member so that said elastic motion transmitting member dampens a peak torque occurring when said wind-up means is disconnected from said movable member and said main spring becomes again effective in said other position of said movable member, whereby said record carrier continues to move at a constant speed when said peak torque occurs.

4. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a buffer spring having one end connected to said movable member so as to be tensioned by said main spring during movement of said movable member to said one position; holding means for holding said one end of said buffer spring so as to prevent untensioning of the same while said movable member is moved by said wind-up means to said other position; transmission means including a first transmission member connected to the other end of said buffer spring end driven by said main spring through said movable member and through said buffer spring during movement of said movable member to said one position and being driven by said buffer spring during movement of said movable member to said other position, a second rotary transmission member connected to and driven from said first transmission member at a lower rotary speed, a third transmission member, and an elastic dampening motion transmitting member connecting said second and third transmission members, said elastic motion transmitting member including a tubular part consisting of an elastomer, and two end parts respectively secured to said second and third transmission members; and a record carrier driven from said third transmission member so that said elastic motion transmitting member dampens a peak torque occurring when said wind-up means is disconnected from said movable member and said main spring becomes again effective in said other position of said movable member, whereby said record carrier continues to move at a constant speed when said peak torque occurs.

5. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a one way coupling including a coupling pawl mounted on said movable member, and a ratchet wheel turnably mounted on said movable member and being engaged by said coupling pawl; a coiled buffer spring having one end secured to said ratchet wheel so as to be tensioned by said main spring during movement of said movable member to said one position; holding means including a blocking pawl engaging said ratchet wheel and preventing turning of the same in one direction for holding said one end of said buffer spring so as to prevent untensioning of the same while said movable member is moved by said wind-up means to said other position; transmission means including a first transmission member connected to the other end of said buffer spring and driven by said main spring through said movable member and through said buffer spring during movement of said movable member to said one position and being driven by said buffer spring during movement of said movable member to said other position, a second transmission member connected to and driven from said first transmission member at a lower speed, a third transmission member, and an elastic dampening motion transmitting member consisting of an elastomer and connecting said second and third transmission members; and a record carrier driven from said third transmission member so that said elastic motion transmitting member dampens a peak torque occurring when said wind-up means is disconnected from said movable member and said main spring becomes again effective in said other position of said movable member, whereby said record carrier continues to move at a constant speed when said peak torque occurs.

6. A driving arrangement, comprising, in combination, a motor producing a variable torque including a peak torque; a reduction transmission means including a first transmission member driven from said motor at a first speed, a second transmission member driven from said first transmission member at a lower speed, a third transmission member, and an elastic dampening motion transmitting member made of an elastomer connecting said second and third transmission members; and record carrier means operatively connected to and driven from said third transmission member so that said elastic motion transmission member dampens a peak torque produced by said motor whereby said record carrier means moves at constant speed.

7. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a reduction transmission means including a first transmission gear driven from said movable gear at a first speed, a second transmission gear driven from said first transmission member at a lower speed, a third transmission gear, and an elastic motion transmitting member consisting of an elastomer adapted to consume energy by inner friction and connecting said second and third transmission gears; and rotary record carrier means operatively connected to and driven from said third transmission gear so that said elastic motion transmission member dampens a peak torque occurring when said wind-up means is disconnected from said movable member and said main spring becomes effective in said other position of said movable member whereby said record carrier means moves at constant speed.

8. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a reduction transmission means including a first transmission gear driven from said movable gear at a first speed, a second transmission gear driven from said first transmission member at a lower speed, a third transmission gear, and an elastic dampening motion transmitting member consisting of an elastomer and having cylindrical configuration and one end secured to said second transmission gear and the other end secured to said third transmission gear; and rotary record carrier means operatively connected to and driven from said third transmission gear so that said elastic motion transmission member dampens a peak torque occurring when said wind-up means is disconnected from said movable member and said main spring becomes effective in said other position of said movable member whereby said record carrier means moves at constant speed.

9. A driving arrangement, comprising, in combination, a motor producing a variable torque including a peak torque; a driven element; and torque and motion transmitting means connecting said motor with said driven element and including two resilient torque and motion transmitting members having different resiliency, one of said members being a springy resilient member, and the other member consisting of an elastomer adapted to dampen a peak torque produced by said motor whereby said driven element rotates at a constant speed.

10. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a driven record carrier; and torque and motion transmitting means connecting said movable member with said record carrier and including two resilient torque and motion transmitting members having different resiliency, one of said torque and motion transmitting members being a metal spring adapted to quickly recover to discharge all the energy stored therein, and the other of said torque and motion transmitting members consisting of an elastomer.

11. In a wind-up arrangement for a spring motor, in combination, a spring motor including a member movable between two positions, and a main spring urging said movable member to move to one of said positions; wind-up means for moving said movable member to the other position thereof; means for actuating said wind-up means when said movable member arrives in said one position and for disconnecting said wind-up means from said movable member when the same arrives in said other position; a driven record carrier; and torque and motion transmitting means connecting said movable member with said record carrier and including two resilient torque and motion transmitting members having different resiliency, one of said torque and motion transmitting members being a metal coil spring adapted to quickly recover to discharge all the energy stored therein, and the other of said torque and motion transmitting members being of tubular shape and consisting of an elastomer.

References Cited in the file of this patent

UNITED STATES PATENTS 2,318,453    Bernard ---------------- May 4, 1943
2,497,623    Nolen ----------------- Feb. 14, 1950